US005414249A

United States Patent [19]

Matsumoto

[11] Patent Number: 5,414,249

[45] Date of Patent: May 9, 1995

[54] AUTOMATIC GATE APPARATUS

[75] Inventor: Kozo Matsumoto, Kanagawa, Japan

[73] Assignee: Kabushiki Kaisha Toshiba, Kawasaki, Japan

[21] Appl. No.: 93,755

[22] Filed: Jul. 20, 1993

[30] Foreign Application Priority Data

Jul. 20, 1992 [JP] Japan .................................. 4-192345

[51] Int. Cl.[6] .............................................. G06F 15/30

[52] U.S. Cl. .................................... 235/384; 235/380; 235/382

[58] Field of Search ......................... 235/384, 380, 382

[56] References Cited

U.S. PATENT DOCUMENTS 3,501,622 3/1970 Weir et al. .......................... 235/384
4,303,904 12/1981 Chasek ............................... 235/384
4,977,501 12/1990 Lefevre ............................... 235/384
5,191,195 3/1993 Aubrey ............................... 235/384
5,266,785 11/1993 Sugihara ............................. 235/384
5,274,218 12/1993 Urata et al. ......................... 235/384

FOREIGN PATENT DOCUMENTS 3268195 11/1991 Japan .
447390 2/1992 Japan .
4160586 6/1992 Japan .

*Primary Examiner*—Harold Pitts

*Attorney, Agent, or Firm*—Cushman, Darby & Cushman

[57] ABSTRACT

An automatic gate apparatus is located at a station and located at regular intervals apart from other automatic gate appratus, for communicating data stored in a wireless medium which is carried by a customer and has a data memory storing the data including identification data and section information representative of a section from one to the other of the station and a transmitter transmitting the data stored in the memory. The apparatus includes a memory for storing location information representative of the location of the apparatus. The apparatus generates a first level signal so as to cause the medium, in the regular intervals from the apparatus, to transmit the identification data and the section information and receives the identification data and the section information transmitted by the transmitter of wireless medium in response to the first level signal. The location information stored in the memory is judged that the location information exists within the section information The apparatus further generates a second level signal higher than the first level signal so as to transmit the identification data and the result of the judgment to the wireless medium which stores the same identification data and which is out of the regular intervals from the apparatus, in response to the judgment. The apparatus allows the customer passing thereof in response to the judgment.

7 Claims, 4 Drawing Sheets

AUTOMATIC GATE APPARATUS

BACKGROUND OF THE INVENTION

1. Field of the Invention

The present invention relates to an automatic gate apparatus which is installed at a ticket gate of a station and the like and, more particularly to an automatic gate apparatus which exchanges examination data recorded on an information medium by wireless communication between the main body of the gate apparatus and the information medium carried by a customer.

2. Description of the Related Art

On a conventional automatic gate apparatus, a commutation ticket is inserted by a customer into the insert port provided on the main body of the gate apparatus and the validity of the commutation ticket is checked. Based on the result of this check, the doors are opened to allow a customer to pass through the gate or the alarm sounds and the doors are shut to obstruct a customer from passing through the gate. In order to be checked by the automatic gate apparatus, examination data, such as names of stations to get on/off, a boarding section, the valid using term, etc. are magnetically recorded on the commutation ticket.

In this case, a customer inserts his commutation ticket into the insert port provided on the main body of the apparatus, moves to the take-out port to which the commutation ticket is transported and takes the ticket discharged out of the take-out port. So, the movement of customer corresponds to the movement of the commutation ticket.

However, in the conventional automatic gate apparatus the customer must insert the commutation ticket, on which examination data are magnetically recorded, into the insert port. A customer is used to keep the commutation ticket in a ticket holder and when using the automatic gate apparatus, the customer must remove the commutation ticket from the ticket holder and insert it into the insert port and put the ticket discharged from the take-out port back in the ticket holder again. The operation requiring that the customer remove the commutation ticket from the ticket holder and return the commutation ticket to the ticket holder is very troublesome.

A wireless card being which is used as an information medium has been proposed recently with this system, the customer is able to pass through a radio communication area of an automatic gate apparatus without taking his wireless card out of his commutation ticket holder.

That is, an automatic gate apparatus using a wireless card is provided with an antenna on one of a pair of gate members which form a passageway. There is a radio communication area established in the passageway to make the communication area possible to exchange examination data by a radio wave generated from the antenna and a radio wave generated from a wireless card carried by a customer when he passes through the passageway.

In stations and the like, the automatic gate apparatus are installed side by side in many cases. In these cases, for instance, a first automatic gate apparatus and an adjacent second gate apparatus are installed side by side, and a first and a second radio communication areas are established for the first and the second automatic gate apparatus, respectively. The radio communication area is established in a large circle or a semi-circle so that the automatic gate apparatus can exchange examination data with a wireless card carried by a customer who is passing through the automatic gate apparatus. As a result, the first and the second radio communication areas overlap each other.

Therefore, if a customer, crossing the entrance of the first automatic gate apparatus, passes through the second automatic gate apparatus, he may pass through both the first and the second radio communication areas. As a result, both gates of the first and the second gate apparatus may open to allow the customer to pass through both the gates when examination data generated from a wireless card carried by this customer are received. At the same time, the examination data transmitted from both the first and the second gate apparatus are written onto the wireless card carried by this customer. At this time, if a second customer passes through the first automatic gate apparatus almost at the same time, he is allowed to pass through the gate without the examination data from the first automatic gate apparatus written onto his wireless card. As a result, if the second customer who passed through the first automatic gate apparatus gets off a train at a different station and tries to pass through an automatic gate apparatus of that station, the gate will be shut and he cannot get out the gate as no examination data have been written on his wireless card at the station he previously entered.

Therefore, the radio communication areas of a plurality of automatic gate apparatus with wireless cards carried by customers cannot be made so large that they cross each other.

On the other hand, if the radio communication area of automatic gate apparatus with wireless cards is too small, examination data cannot be exchanged with wireless cards accurately.

SUMMARY OF THE INVENTION

It is an object of the present invention to provide an automatic gate apparatus which is capable of executing gate processing for customers who are carrying a wireless information medium.

According to the present invention there is provided an automatic gate apparatus, which is located at a station located at regular intervals apart from other automatic gate apparatus, for communicating data stored in a wireless medium which is carried by a customer. The gate apparatus has a memory that stores data including identification data and section information representative of a section from one to the other of the station and a transmitter transmitting the data stored in the memory. The apparatus comprising means for storing location information representative of the location of the appratus; first generating means for generating a first level signal so as to cause the medium, in the regular intervals from the apparatus, to transmit the identification data and the section information; means for receiving the identification data and the section/formation transmitted by the transmitter of wireless medium in response to the first level signal generated by the first generating means; means for judging that the location information exists within the section information; second generating means for generating a second level signal higher than the first level signal so as to transmit the identification data and the result of the judgment of the judging means to the witless medium which stores the same identification data and which is out of the regular intervals from the apparatus, in response to the judgment of the judging means; and gate means for allowing the customer to pass the apparatus in response to the judgment of the judging means.

DETAILED DESCRIPTION OF THE PREFERRED EMBODIMENT

Referring to the accompanying drawings, a detailed description of the preferred embodiment of the present invention will be subsequently given.

Figure 1:
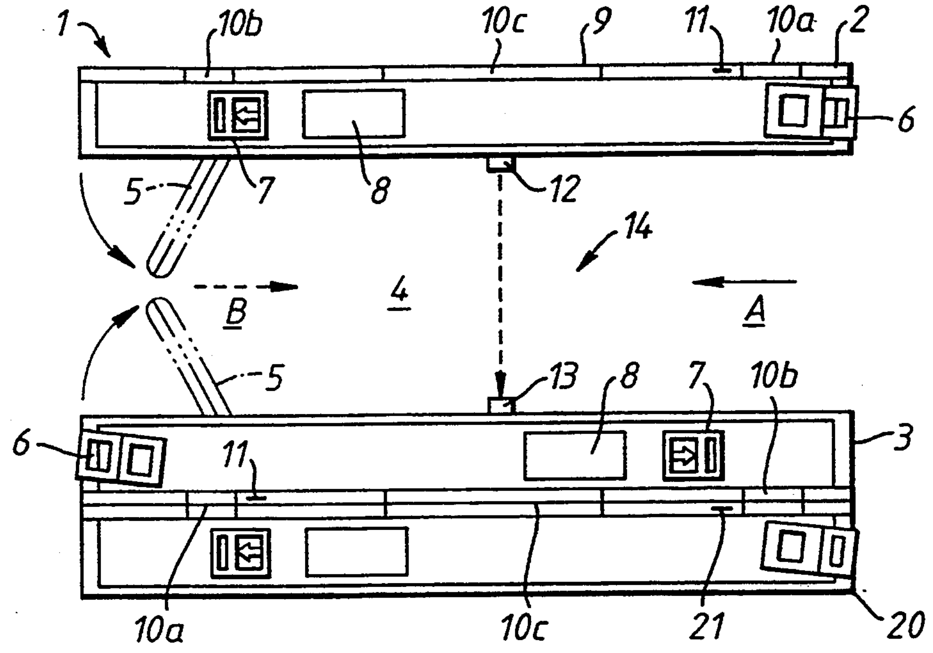
FIG. 1 is a plan view showing one embodiment of an automatic gate apparatus of the present invention.
Figure 2:
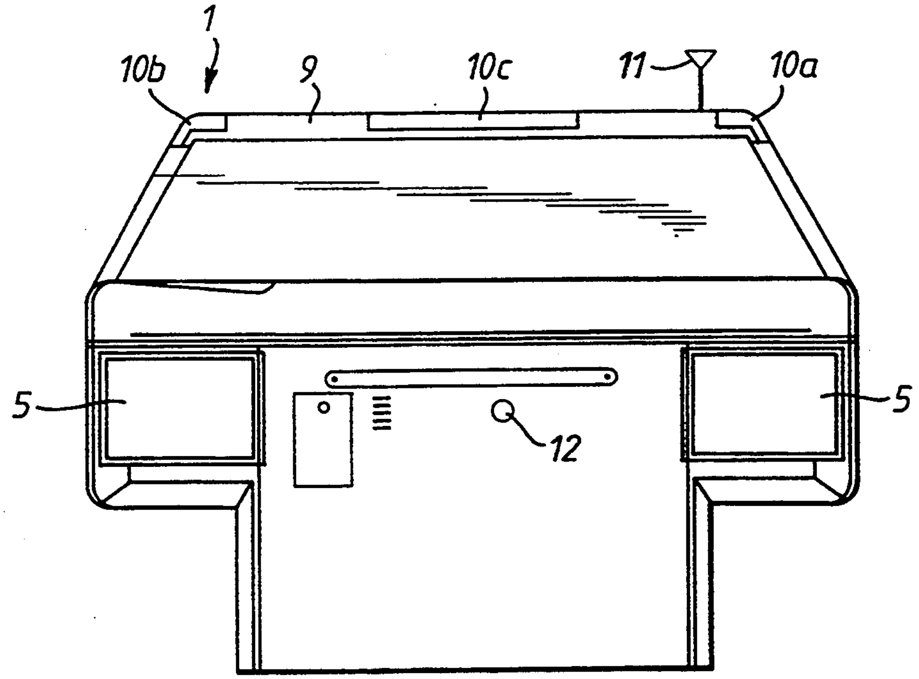
FIG. 2 is a front view of the automatic gate apparatus shown in FIG. 1.

FIGS. 1 and 2 are a plan view and a front view, respectively showing one preferred embodiment of an automatic gate apparatus of the present invention.

An automatic gate apparatus 1 of the present invention comprises an entrance units 2 which is composed of gate members, and an exit unit 3, which is also composed of gate members. That is, the entrance unit 2 for entering into a station yard and the exit unit 3 for getting out of the station yard are arranged in parallel with each other, and a passageway 4 through which customers pass is formed between them.

The exit unit 3 is joined with another entrance unit (other unit) 20 comprising the gate members of an automatic gate apparatus adjacent to the exit unit 3.

The entrance unit 2 is provided with doors 5 which open/shut the passageway 4. An insert port 6 into which a ticket is inserted and a take-out port 7 from which a ticket is discharged are arranged on the top of the entrance unit 2. Further, on the top of the entrance unit 2, a display 8 like, for instance, a liquid crystal display, is provided in front of the take-out port 7 in the direction of progress to display a guidance concerning a commutation ticket, an ordinary ticket and so on.

On a frame 9, which is projecting to the top of the entrance unit 2, corner displays 10*a* and 10*b* and a center display 10*c* are arranged. The operating state of the automatic gate apparatus 1 is displayed by these displays. For instance, a blue indicator represents a working state and a red indicator represents a stopped state.

The frame 9 is provided with an antenna 11 as a transmission/reception means located at the entrance side of the entrance unit 2. Examination data is transmitted/received between this antenna 11 and a wireless card C (not shown) which is an information medium with examination data recorded thereon.

An optical element 12 and a receiving element 13 are mounted facing each other on the sides of the entrance unit 2 and the exist unit 3, thus forming a detecting means 14 to detect passage of customers.

The exit unit 3 has the same construction as the entrance unit 2 and is arranged in a direction reverse to that of the entrance unit 2. As a result of such arrangement of the entrance unit 2 and the exit unit 3, the automatic gate apparatus functions as a gate apparatus for entering into a station yard when a customer is moving in the direction A as shown in FIG. 1 and as a gate apparatus for exiting the station yard when moving in the direction B as shown in FIG. 1.

The entrance unit 20 has the same construction as the entrance unit 2 and is arranged in the same direction as the entrance unit 2. The entrance unit 20 also has an antenna 21 in the same construction as the antenna 11.

Figure 3:
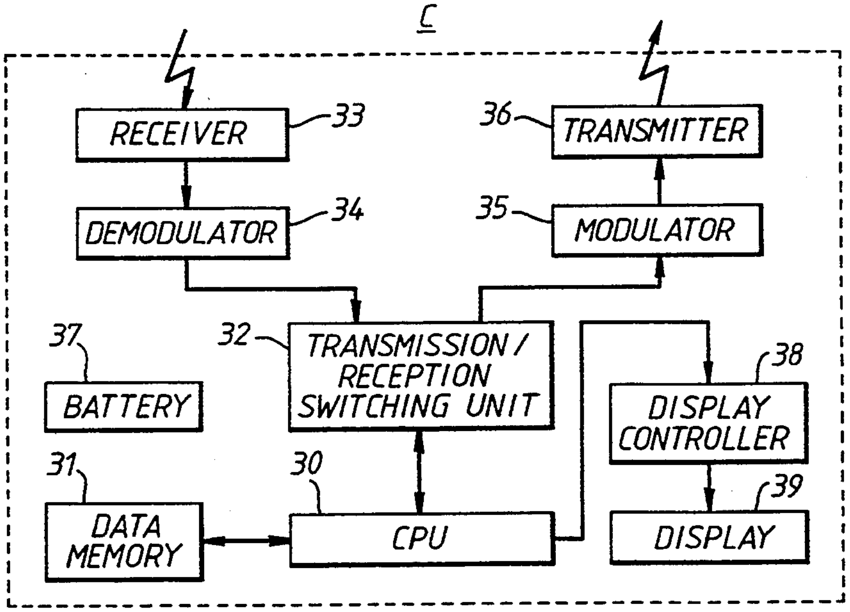
FIG. 3 is a block diagram showing the construction of a wireless card which is used fop the automatic gate apparatus of the present invention.

FIG. 3 is a block diagram showing the construction of the wireless card C which is used for the automatic gate apparatus of the present invention. The wireless card C comprises a CPU 30, a data memory 31 for storing a control program and examination data, a transmission/reception switching unit 32, a receiver 33 for receiving signals from the automatic gate apparatus 1, a demodulator 34 for demodulating a signals from the receiver 33, a modulator 35 for modulating data from the data memory 31 to data signals, a transmitter 36 for transmitting data signals from the modulator 35 to the automatic gate apparatus 1, and a battery 37 for supplying voltage to the units. A display 39 is connected to the CPU 30 of this wireless card C through a display controller 38. For instance, an LCD (Liquid Crystal Display) is used as the display 39. The examination data which are stored in the data memory 31 are such data as ID code, ticket issue number, boarding section, valid boarding term, classification of male/female, classification of child/adult, previous using time of the automatic gate apparatus, etc. These units are composed of an IC chip and provided on a single substrate in a card shape.

Figure 4:
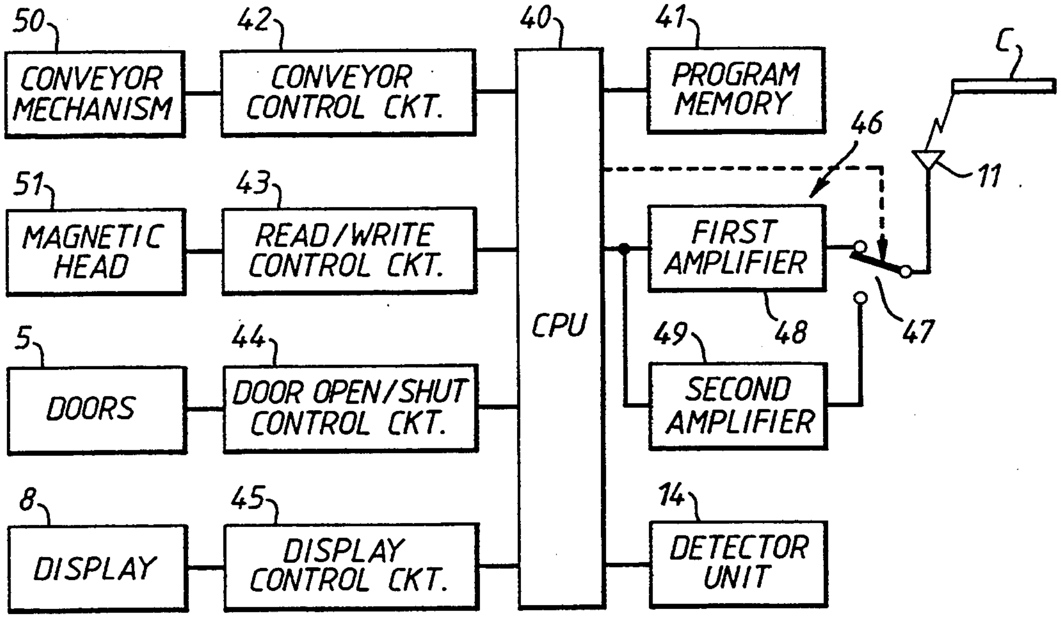
FIG. 4 is a control block diagram of the automatic gate apparatus shown in FIG. 1.

FIG. 4 is a block diagram showing the control system of the automatic gate apparatus 1.

This automatic gate apparatus 1 includes a CPU 40, a program memory 41, a conveyor control circuit 42, a read/write control circuit 43, a door open/shut control circuit 44, a display control circuit 45, the detection means 14, and an area switching circuit 46, all of which are connected to the CPU 40. The automatic gate apparatus in the construction described above executes gate processing by taking a commutation ticket or an ordinary ticket with magnetically written examination data, which is inserted into the insert port 6, from the take-out port 7 and also, the function to executes the gate processing by passing a commutation ticket composed of a wireless card C with examination data stored through a radio communication area.

The program memory 41 is composed of a ROM storing a program for processing the CPU 40 in advance.

The conveyor control circuit 42 controls a conveyor mechanism 50 which conveys a commutation ticket that has magnetically written examination data or an ordinary ticket through the conveying path from the insert port 6 to the take-out port 7.

The read/write control circuit 43 is connected to a magnetic head 51 which is provided in the conveying path from the insert port 6 to the take-out port 7. Read/write of examination data from/to a commutation ticket or an ordinary ticket is made by this magnetic head 51.

The door open/shut control circuit 44 controls the open/shut of the doors 5 according to the examination data of a commutation ticket OF an ordinary ticket read by the magnetic head 51.

The display control circuit 45 controls the display 8 which displays instructions to customers who use the automatic gate apparatus.

The area switching circuit 46 is composed of a first amplifier 48 and a second amplifier 49. The first amplifier 48 and the second amplifier 49 of the area switching circuit 46 are changed over by a switch 47 which is controlled by the CPU 40.

Figure 5:
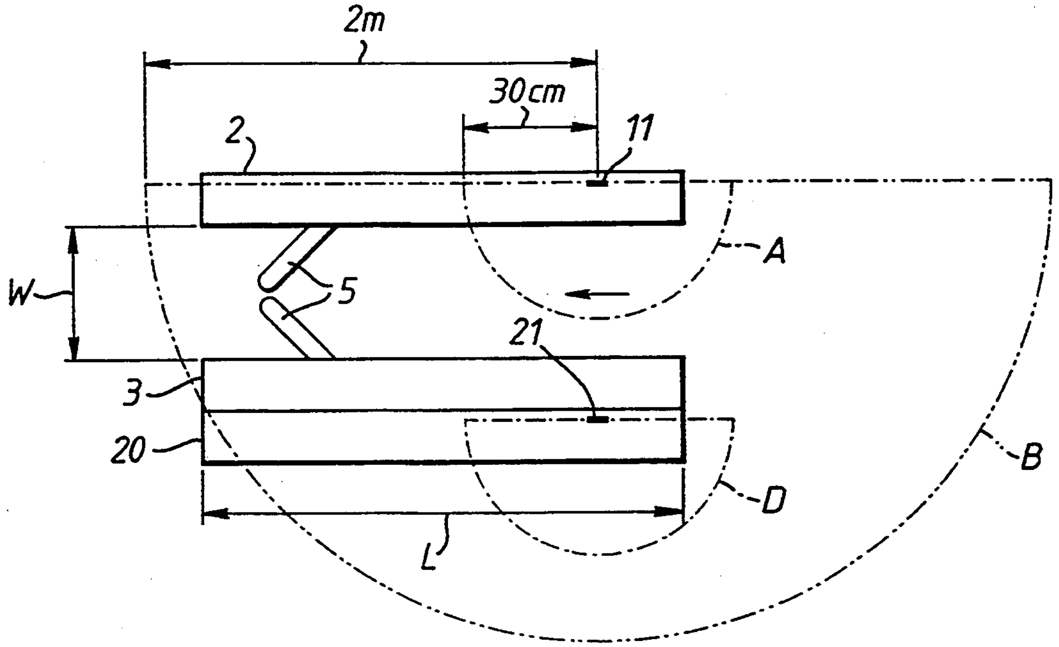
FIG. 5 is an explanatory diagram showing radio communication areas of the automatic gate apparatus of the present invention.

The radio communication area of the first amplifier 48 is in a semi-circle with a radius of about 30 cm. The radio communication area of the second amplifier 49 is also in a semi-circle with the radius of about 2 m. The amplification degree of the second amplifier 49 is set larger than that of the first amplifier 48. As a result, the radio communication area by the antenna 11 is composed of a first communication area A of the first amplifier 48 and a second communication area B of the second amplifier 49 as shown in FIG. 5.

The entrance unit 2 and the exit unit 3 are about 1.7 m long. The width W of the passageway 4 formed by the entrance unit 2 and the exit unit 3 is about 50 cm.

The communication area B extends to an adjacent entrance unit 20.

Specific data to specify the automatic gate apparatus 1 is sent to the wireless card C through the area switching circuit 46 and the antenna 11. When the wireless Card C sends back response data to the specific data received, the CPU 40 changes the connection of the antenna 11 from the first amplifier 48 to the second amplifier 49 through the switch 47.

Figure 6:
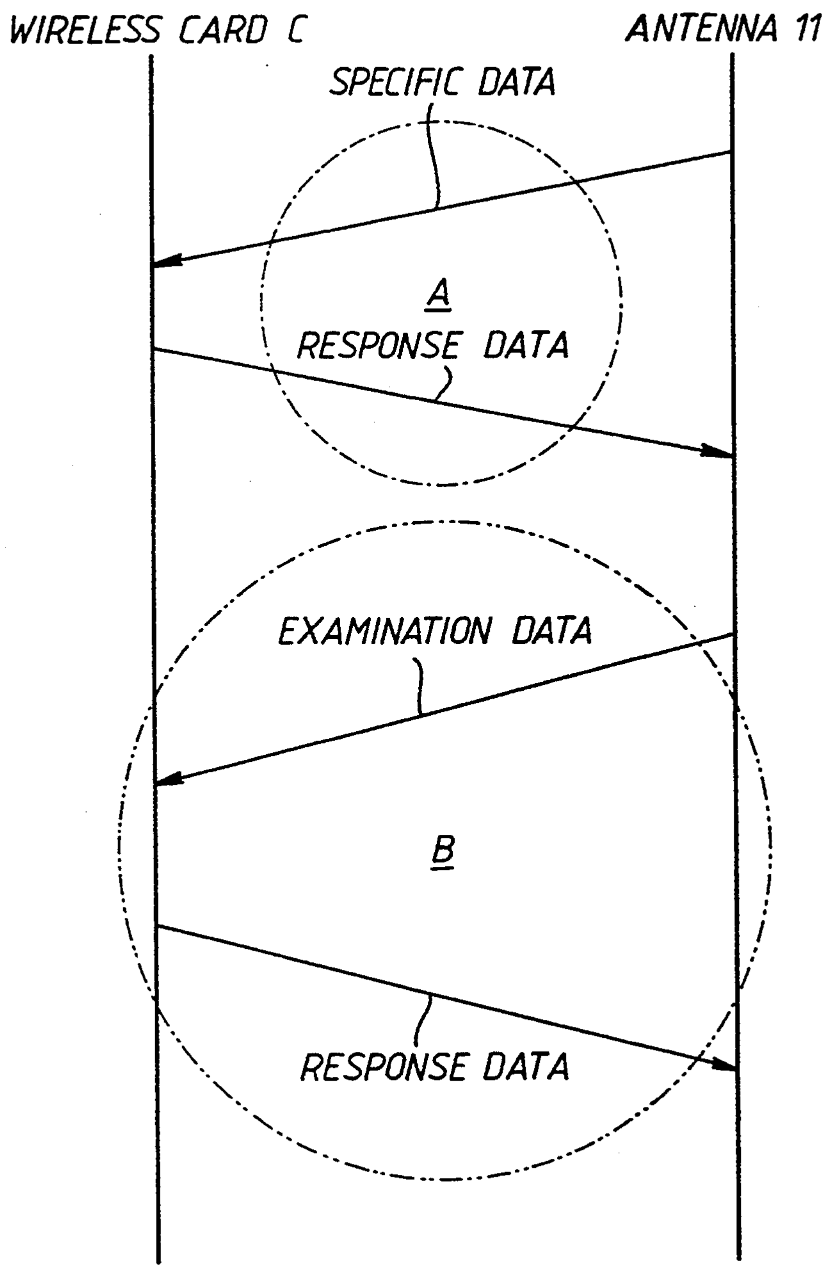
FIG. 6 is a diagram for explaining a radio communication state between the automatic gate apparatus and the wireless card carried by a customer in the automatic gate apparatus of the present invention.

Referring to FIGS. 4 to 6, the operation of the automatic gate apparatus will now be described.

The switch 47 of the area switching circuit 46 of the automatic gate apparatus I has been changed over to the first amplifier 48 side under the control of the CPU 4. Therefore, microwave signals are generated from the antenna 11 extending to the first communication area A. In this first communication area A, specific data (Specific No.) to specify the automatic gate apparatus 1 is provided via the microwave signals. If a customer carrying the wireless card C gets near the automatic gate apparatus 1 and enters in the first communication area A, the wireless card C receives the specific data from the antenna 11. Upon receiving this specific data, the wireless card C sends back response data to the antenna 11. This response data contains such data as ID code, ticket issue number, boarding section, valid boarding term, classification of male/female, classification of child/adult, previous using time of the automatic gate apparatus, etc. which are stored in the wireless card C. This response data is sent to the CPU 40 through the first amplifier 48. The CPU 40 judges whether such examination data contained in the response data as the boarding period, the valid boarding term, etc. are proper or not. If the examination data are judged proper, the doors 5 are opened by the control of the door open/shut control circuit 44.

At the same time, the CPU 40 changes over the switch 74 to the second amplifier 49 side. That is, the radio communication area of the antenna 11 is switched from the first communication area A to the second communication area B. Examination data are sent to the wireless card C carried by the customer who is passing through the passageway 4 by loading them on microwave being generated extending over the second communication area B. The received ID code, the using time of the automatic gate apparatus of this time, station name code, etc. are contained in this examination data and are written onto the wireless card C carried by the customer.

Response data showing that these examination data have been written onto the wireless card C are sent from the wireless card C to the antenna 11. When the antenna 11 receives this response data, the gate processing for one customer is completed.

The other side, the entrance unit 20 generates a microwave extending to a third communication area D same as the first communication area A via an antenna 21 provided on the entrance unit 20 under the control of the CPU. The communication area A does not intersect the communication area D. Therefore, a radio interference is not occured between the communication areas A and B.

As described above, in the first communication area A, which is the examination data exchange area specified by the antenna 11, the correspondence between the automatic gate apparatus 1 being used and an applicable wireless card C is specified by the specific data for the wireless card C. Further, in the second communication area B, additional examination data are exchanged between the antenna 11 and the specified wireless card C. Therefore, even if a radio communication area crosses with an adjacent radio communication area of the automatic gate apparatus, examination data can be exchanged accurately between the automatic gate apparatus 1 and an applicable wireless card C. That is, the gate processing for a customer who is carrying a wireless card can be fairly executed.

As described above, it is possible to provide an automatic gate apparatus which is capable of certainly and properly executing the gate processing for a customer who has a wireless information medium.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An automatic gate system, including at least a first automatic gate apparatus having a pair of gate members defining a passageway therebetween, wherein a second automatic gate apparatus is capable of being arranged side-by-side to the first automatic gate apparatus, the first and second gate apparatuses are adapted to be installed at a station in a transit system, the first automatic gate apparatus including first transmission means and the second automatic gate apparatus including second transmission means for communicating with a wireless medium which is carried by a customer, the wireless medium including a memory capable of storing identification data therein and a transmitter capable of wirelessly transmitting the data stored in the memory when the wireless medium receives correspondence data specifying a correspondence between the wireless medium and the first automatic gate apparatus, the system comprising:

means for storing station name information representative of the location of the automatic gate system within the transit system;

first generating means for generating a first signal for wirelessly transmitting data via the first transmission means to the wireless medium, the first signal being limited to a first communication area defined within the passageway;

means for receiving the identification data transmitted by the wireless medium, the identification data being transmitted by the wireless medium in response to the reception of correspondence data provided in the first signal;

means for judging whether the identification data transmitted by the wireless medium is proper based on the station name information stored in the storing means;

second generating means for generating a second signal, for wirelessly transmitting identification data and the station name information to the wireless medium, wherein the wireless medium is capable of storing the identification data in the memory, the second signal being transmitted at a level so as to cover a second communication area, the second communication area including therein the first communication area of the first automatic gate apparatus and a first communication area of the second automatic gate apparatus located adjacent to the first automatic gate apparatus;

means for switching from the first generating means to the second generating means when the judging means judges that the identification data transmitted by the wireless medium is proper; and means for allowing a customer to pass through the passageway when the judging means judges that the identification data is proper.

2. The system of claim 1, wherein the first generating means includes an antenna.

3. The system of claim 1, wherein the first generating means generates microwave signals.

4. The system of claim 1, wherein the first and second generating means generates microwave signals via a single antenna.

5. The system of claim 1, wherein the first and second generating means include a first amplifier and a second amplifier, wherein the degree of amplification in the second amplifier is larger than that of the first amplifier.

6. The system of claim 2, wherein the gate member includes an insert port into which an information medium with magnetic examination data recorded is capable of being inserted, means for conveying the information medium inserted from the insert port, and a takeout port which discharges the information medium conveyed by the conveying means.

7. The system of claim 6, wherein the gate member includes a magnetic head for reading the magnetic examination data recorded on the information medium which is conveyed by the conveying means.

* * * * *